United States Patent

Beausoleil

[15] 3,654,622

[45] Apr. 4, 1972

[54] AUXILIARY STORAGE APPARATUS WITH CONTINUOUS DATA TRANSFER

[72] Inventor: William F. Beausoleil, Poughkeepsie, N.Y.

[73] Assignee: International Business Machines Corporation, Armonk, N.Y.

[22] Filed: Dec. 31, 1969

[21] Appl. No.: 889,433

[52] U.S. Cl. ....................340/172.5

[51] Int. Cl. ....................G06f 7/34

[58] Field of Search ....................340/172.5, 173

[56] References Cited

UNITED STATES PATENTS

| | | | |
|---|---|---|---|
| 3,435,423 | 3/1969 | Fuller et al. | 340/172.5 |
| 3,471,835 | 10/1969 | Gribble et al. | 340/172.5 |
| 3,441,912 | 4/1969 | Henle | 340/172.5 |
| 3,340,514 | 9/1967 | Swift | 340/172.5 |
| 3,388,383 | 7/1968 | Shivdasani et al. | 340/172.5 |
| 3,478,325 | 10/1969 | Oeters et al. | 340/172.5 |

*Primary Examiner*—Paul J. Henon
*Assistant Examiner*—Mark Edward Nusbaum
*Attorney*—Hanifin and Jancin and Owen L. Lamb

[57] ABSTRACT

An electronic bulk storage having the characteristics of a sequential access storage device. Data are stored parallel by word in a plurality of electronically rotatable memory elements selectable by a memory selection matrix. Each element has a feed-back loop for recirculating data and when selected, a group of elements at an address N is read in parallel a word at a time by electronically rotating data bits stored in the selected memory elements at an address. Controls are provided to select memory elements *N*+1 whenever elements at address *N* are selected by the selection matrix. First data is read out of the elements at address *N* and then data is read out of the elements at address *N*+1 without any time lost for reselection of memory elements.

13 Claims, 8 Drawing Figures

Patented April 4, 1972 3,654,622

6 Sheets-Sheet 1

INVENTOR
WILLIAM F BEAUSOLEIL

BY Owen Lamb
ATTORNEY

Patented April 4, 1972 3,654,622

6 Sheets-Sheet 2

Patented April 4, 1972

3,654,622

6 Sheets-Sheet 5

AUXILIARY STORAGE APPARATUS WITH CONTINUOUS DATA TRANSFER

BACKGROUND OF THE INVENTION

The invention relates to auxiliary storage devices for use with a data processing system.

This application is an improvement over the invention disclosed in copending application Ser. number 889,435 entitled "Auxiliary Storage Apparatus" by William F. Beausoleil, Fred A. Ordemann, Jr., Wilbur D. Pricer, and Norbert G. Vogl, Jr., filed Dec. 31, 1969, and incorporated herein by reference.

The above mentioned patent application discloses an electronic bulk storage having the characteristics of a sequential access storage device, such as a disk or a drum. The storage device employs memory elements in which data bits are electronically rotatable and which are selectable by a memory matrix. The elements operate in conjunction with timing means and data access controls to provide a variable instantaneous data rate.

Synchronous data transfer between the memory and an external data utilization device is possible because the rotation is electronic rather than mechanical. However, the maximum data rate can be maintained only up to the point of the data boundary of words stored within the selected rotatable memory elements. When a data record to be transferred exceeds this boundary, the data transmission from the selected elements is halted at the boundary, the selected elements are deselected, and new elements must be reselected. The interruption of the data transfer for selection and reselection reduces the effective data rate for records that span boundaries.

SUMMARY OF THE INVENTION

It is a primary object of this invention to provide an improved sequential access storage device in which sequential data records can be read without the interruption caused by deselection and reselection of memory elements within the storage.

Briefly, the above object is accomplished in accordance with the invention by causing memory elements containing the next sequential address locations to be selected along with the elements in which the current address locations are found. This look-ahead or overlap operation synchronizes the memory elements so that when a word boundary is reached, the data transfer operation is switched to the memory elements containing the next sequential data word without imposing a delay for deselection and reselection of memory elements.

More specifically, in accordance with an aspect of the invention, a plurality of multibit memory elements are arranged in columns and rows in memory planes, one plane for each bit position of a word. Address decoding means are provided for selecting a column and a row to thereby select a first memory element location on each plane, and also to automatically select the next sequential memory element location. Means are provided for electronically rotating data bits stored in the selected memory elements in unison. Means are provided to read out words in parallel, or to write words in parallel, only from the first selected group of memory elements. When a word boundary for the first selected elements is reached, reading or writing for the first elements is halted, and reading or writing for the second selected elements is commenced with no delay imposed for deselection and reselection of memory elements.

The invention has the advantage that a continuous data transfer occurs once the memory is selected because no time is lost during the deselection and reselection of memory elements when long records are to be transferred.

The foregoing and other object, features, and advantages of the invention will be apparent from the following more particular description of a preferred embodiment of the invention, as illustrated in the accompanying drawings.

BRIEF DESCRIPTION OF THE PREFERRED EMBODIMENT

Figure 1:
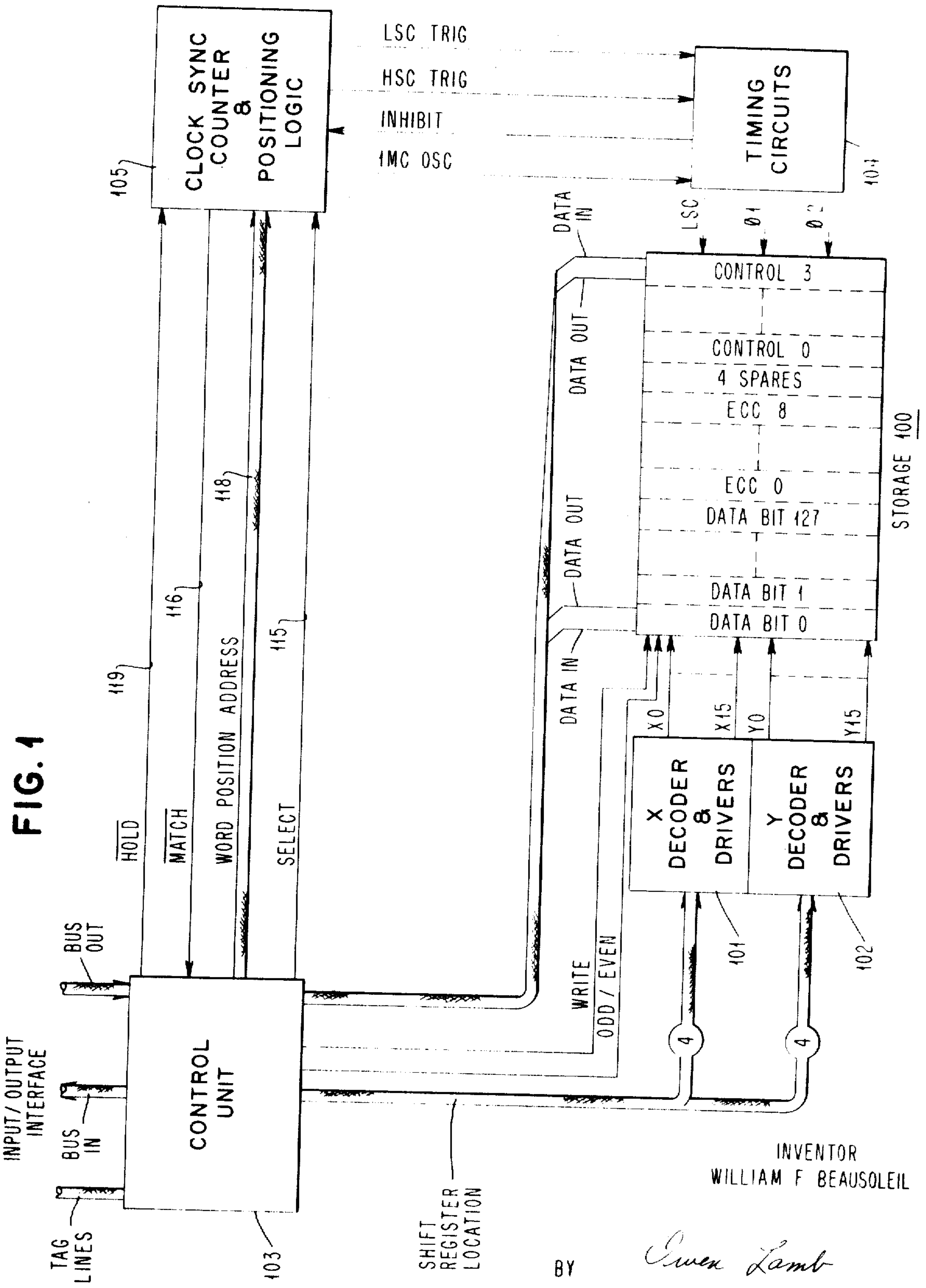
FIG. 1 is a block schematic diagram of an auxiliary storage unit in which the invention is embodied.

Briefly, a preferred embodiment of the invention comprises a bulk storage made up of shift registers arranged in a three-dimensional memory matrix. Each shift register in the matrix has the capacity to store a plurality of bits, for example, 256 bits. Each shift register can be shifted so that these bits are presented in a serial manner at the output of the shift register. Each shift register represents a bit position of a parallel word made up of a plurality of bits. Shift registers are arranged in columns and rows in a memory plane. The shift registers are grouped so that shift registers corresponding to even addresses and shift registers corresponding to odd addresses can be independently selected, that is, whenever an even shift register is selected a corresponding odd shift register is also selected. One odd shift register and one even shift register per plane is selected at a time by energizing X and Y coordinates to thereby select the shift registers at the intersection of the energized coordinates.

Each plane represents a bit position of the parallel word. Means are provided for reading or writing only into either the even shift registers or the odd shift registers. Thus, when the coordinates $X_n$ and $Y_n$ are selected, they select shift register $N$ and select shift register $N+1$ on the first plane, (the first bit of the first word), shift register $N$ and shift register $N+1$ on the second plane, (the second bit position of the word), etc.

As more fully described in the above identified co-pending Beausoleil et al. application, timing circuits are provided for shifting the shift registers and for stepping an address counter which maintains a count of the number of shifts which have taken place to thereby provide an address of the word currently appearing at the output of the shift registers which are selected.

In order to read a particular word from the memory, a position address containing sufficient information to identify the shift registers and the word within the shift registers is presented to the memory. The high order portion of the position address is presented to X and Y decoders wherein the address is decoded to select one X coordinate and one Y coordinate. At each memory plane, further decoding means are provided to select, in addition to the shift register (N) specified by the energized $X_n$ and $Y_n$ coordinate, the next sequential shift register ($N+1$). The shift register at the intersection of the energized X and Y coordinates contains the first word of the record block. The low order portion of the position address contains information identifying the word position within the shift register. This information is provided to a comparator. The shift registers $N$ and $N+1$ selected by the X and Y coordinates are shifted at high speed by the timing circuit and a count is maintained by the address counter of the position of both selected groups of shift registers. When the selected shift registers have been shifted to the point where the contents of the address counter equal the contents of the word position address, the desired word within the first selected group of shift registers $N$ has been reached and a match signal indicates this fact to a control circuit. The high speed shifting operation is stopped and a data word is read from the memory. The next sequential word is read by incrementing the word position address portion of the position address to thereby shift both selected shift registers (shift registers $N$ and $N+1$) one more position. However, only the data in the first selected shift registers $N$ is read from the memory. When a boundary is reached, that is, when all of the words in the first selected shift registers $N$ have been read, the read operation is switched to the second group of shift registers $N+1$ which have been selected with the first group. Because both the shift register groups have been shifted simultaneously, when the first group reaches the end of its boundary, the second group has reached the end of its boundary. Since data are recirculated, the beginning of the boundary of words stored in the second selected shift registers is now available.

The first selected shift registers, which are no longer being read from, are automatically returned to the same relative position as all unselected shift registers in the memory by means of their remaining selected during the reading of the second selected shift registers. When the first selected shift registers have been returned to the same relative position as the non-selected shift registers in the memory, they are deselected and means are provided for selecting the next sequential shift registers $N+2$, but not for reading out of them until the $N+1$ shift registers have reached the data boundary.

DETAILED DESCRIPTION OF THE PREFERRED EMBODIMENT

Referring to FIG. 1, the auxiliary storage unit comprises a storage portion 100; X and Y address decoders 101 and 102; a control unit 103 for interfacing the storage 100 with an input/output interface; timing circuits 104; and a clock synchronization counter and positioning logic 105.

Figure 2:
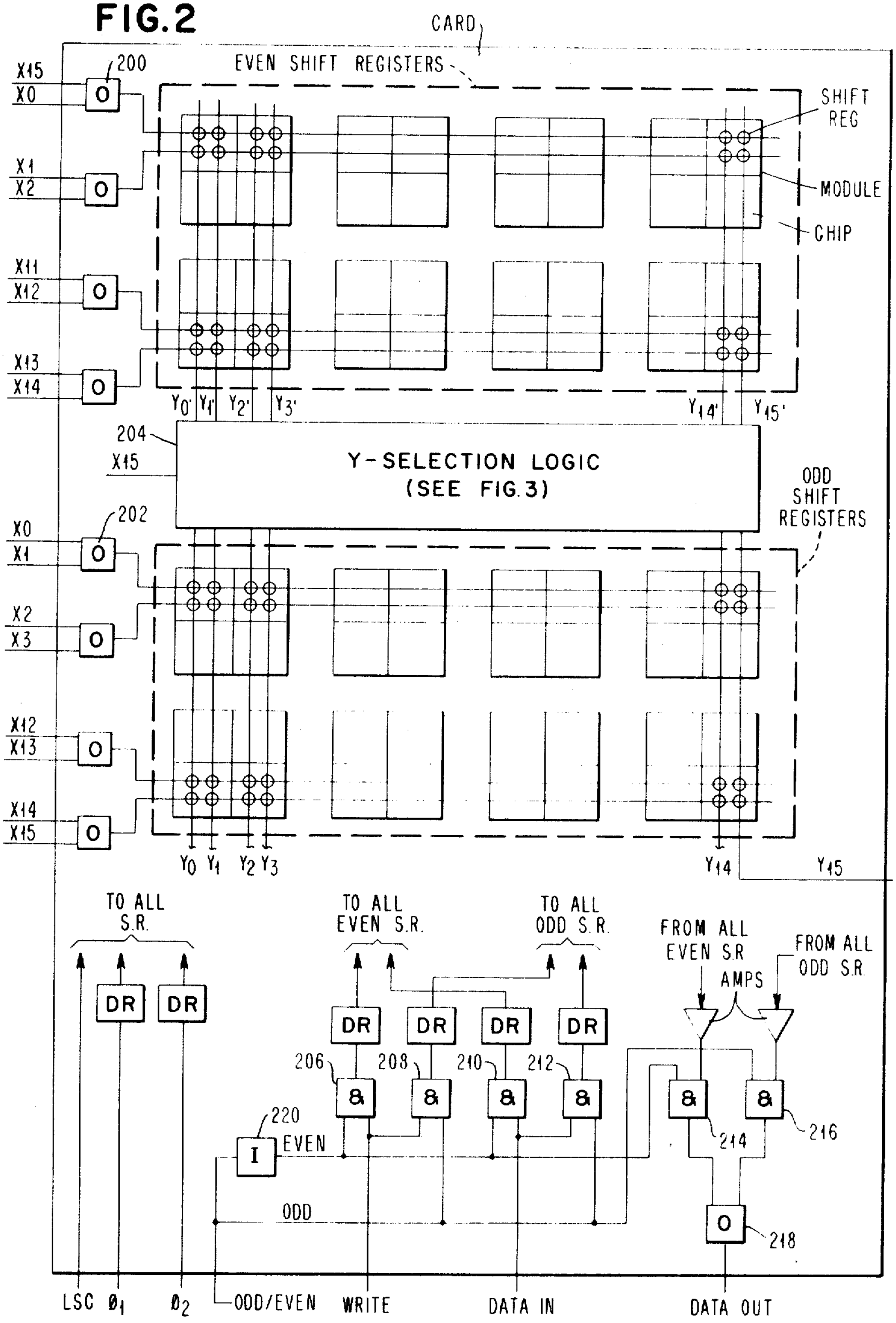
FIG. 2 is a block schematic drawing of one card of a group of cards in the storage 100 shown in FIG. 1.

The storage 100 is made up of a plurality of cards, one of which is shown in FIG. 2. Each card comprises 16 modules. Each module comprises four chips. There are 1,024 memory cells on each chip divided into four field effect transistor (FET) shift registers of 256 bits each. X and Y select lines X0 – X15 and Y0 – Y15 are provided on each card, connected in parallel to all of the cards in the storage.

The external selection of the storage 100 is essentially the same as that described in the above identified copending Beausoleil et al. application. The X and Y decoders 101 and 102 decode bits appearing at the shift register location bus so that one X coordinate and one Y coordinate is energized. Further decoding means are provided on the cards such that if $X_n$ and $Y_m$ are energized, the $k$th shift register on each card in the storage is energized, and in addition, the $k$th + 1 shift register is energized. This is accomplished by dividing the array into even and odd shift register groups. OR circuits 200 are provided for the even shift registers and OR circuits 202 are provided for the odd shift registers. For example, if X0 is energized, the OR circuit 200 is energized and the output thereof is energized through all of the shift registers in the first row of the even shift registers. Additionally, the X0 coordinate energizes OR circuit 202, the output of which threads through all of the shift registers in the first row of the odd shift registers.

If the Y0 coordinate is energized, two shift registers are selected, one in the even shift register group and the other in the odd shift register group. Further Y selection logic 204 is necessary to provide decoding of the Y coordinates. This is necessary whenever the last X coordinate, X15, is energized. When X15 is energized and Y0 is energized, for example, the last shift register in the first column of the odd shift registers (the shift register at the intersection of the energized coordinates Y0 and Y15) is energized. The next sequential even shift register is the first shift register in the second column of the even shift registers. In order for this shift register to be selected, it is necessary to energize the Y coordinate line labelled Y1', while the Y0 coordinate remains selected. In order to accomplish this, whenever the X15 coordinate is energized, the logic 204 automatically causes the next higher numbered Y' coordinate to be selected. Whenever X15 is de-energized, the same numbered Y' coordinate is selected by the logic 204.

Figure 3:
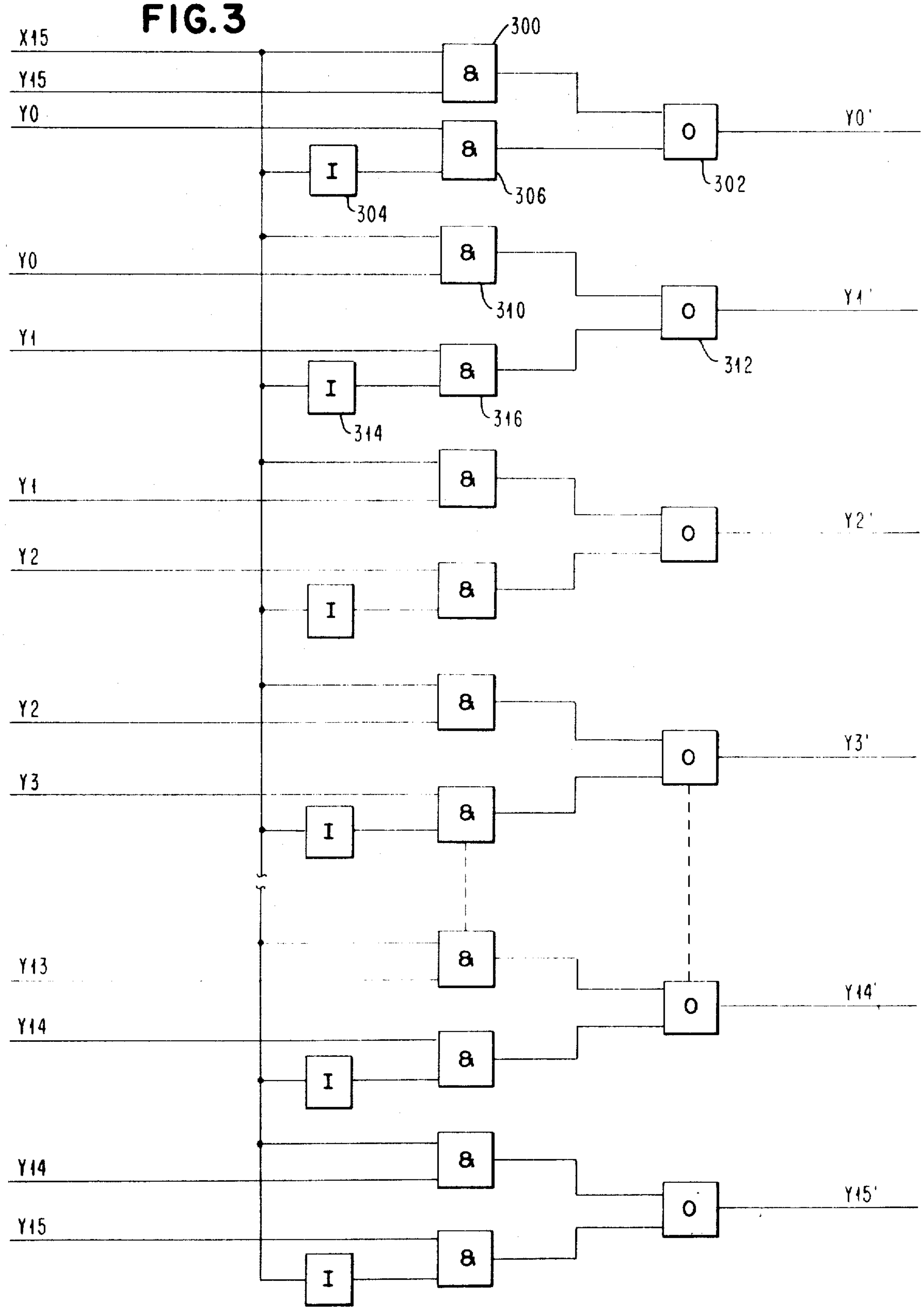
FIG. 3 is a more detailed block schematic diagram of the Y-selection logic shown in FIG. 2.

The Y selection logic is shown in more detail in FIG. 3. Whenever the X15 coordinate is de-energized, the AND circuits 300, 310, etc. remain de-energized. The X15 coordinate drives an inverter 304, 314, etc. to thereby energize AND circuits 306, 316, etc. This permits the respective Y coordinates Y0, Y1, etc. to pass directly through AND circuits 306, 316, to the OR circuits 302, 312 to thereby energize coordinates Y0', Y1', etc. Whenever the X15 coordinate is energized, the next higher numbered Y' coordinate is energized. For example, Y15 passes through AND circuit 300 to energize the Y0' coordinate; Y0 passes through AND circuit 310 to energize OR circuit 312 and therefore the Y1' coordinate, etc.

Each card shown in FIG. 2 contains driver circuits for clocking lines LSC (low speed clock) phase lines $\phi 1$ and $\phi 2$ for driving the shift registers, a write line for energizing the shift register circuits for writing, a data in line for placing data into the shift registers, and a data out line for reading data from the shift registers. The operation of these lines is more fully described in the above identified copending Beausoleil et al. patent application.

An additional odd/even line is provided to the card. When this line is positive, the odd line energizes AND circuits 208, 212, and 216 such that the odd shift register inputs and outputs are energized. When the odd/even line is negative, the output of the inverter 220 is positive thus energizing AND circuits 206, 210 and 214 to energize the even shift register outputs. The odd/even line is controlled by a trigger (not shown) located in the control unit 103 (FIG. 1).

The control unit 103 operates to control the clock sync counter and positioning logic 105 in a manner which is similar to that described in the above identified Beausoleil et al. application. The timing circuits 104 are also described in that application and their control by the logic 105 is identical to that described in the Beausoleil et al. application.

CONTINUOUS READ OR WRITE OPERATION

Figures 4A, 4B, 4C:
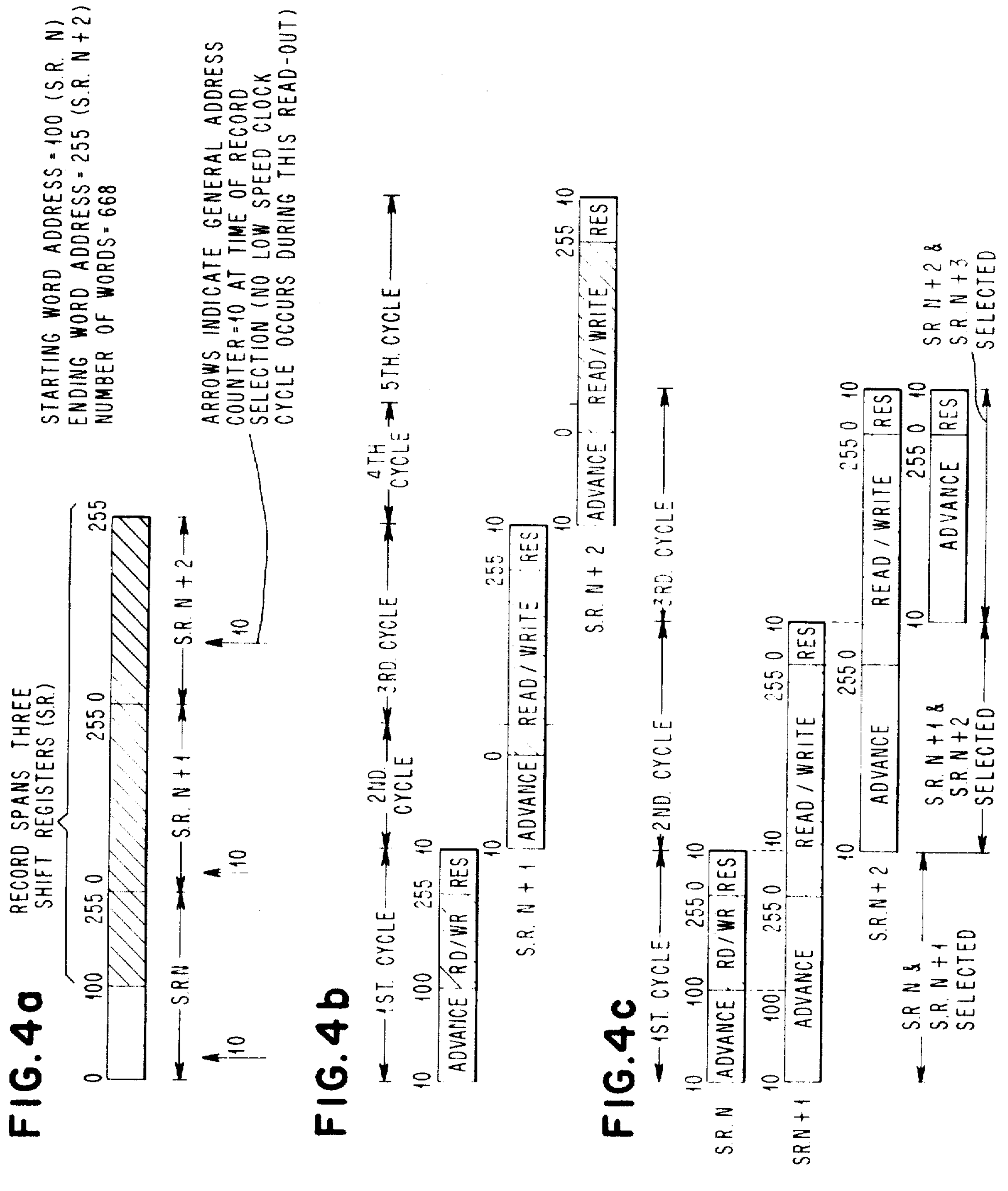
FIGS. 4A - C are timing diagrams illustrating a typical operation of the storage unit of FIG. 1.

Referring to FIG. 4A, a typical record spanning three shift register locations is shown. The starting word address 100 is found at the 100th word position of shift register N. The ending word address 255 is found at the word position boundary of shift register $N+2$. The number of words in the record is 668, spanning three shift registers $N$, $N+1$ and $N+2$.

The shift registers are controlled by a current general address counter and a current specific counter found within the logic 105 (FIG. 1). These counters operate as described in the above mentioned Beausoleil et al. application. The arrows in FIG. 4A indicate that the general address counter is at 10 at the time of the record selection and it is assumed, only for purposes of description, that no low speed clock regeneration occurs during our example.

FIG. 4B illustrates the number of cycles and the time lost between selection and deselection of shift registers when the memory system, as disclosed in the above identified Beausoleil et al. application, is utilized. During the first cycle, the shift registers $N$ are selected and advanced at high speed until the current specific address counter equals the word position address, which in our example is 100. Reading or writing occurs, and the shift registers are shifted after each word, until the current specific address equals 255, the word boundary of the selected shift register $N$. Reading or writing stops, and the shift registers are restored at high speed until the current specific address counter equals the current general address counter (10).

Next, shift registers $N+1$ are selected and advanced until the current specific address counter equals 0. Reading or writing occurs until the address 255 is reached at which time the shift registers $N+1$ are restored to the current general address 10.

Next, the shift registers $N+2$ are selected and advanced until the current specific address counter reads 0. Reading or writing occurs until the address 255 is reached, and the shift registers $N+2$ are restored to the current general address 10.

Five cycles of the memory are necessary to read or write the record.

Reading or writing the same record using the present invention takes only three cycles, as shown in FIG. 4C. Shift register $N$ and shift registers $N$+1 are selected simultaneously and advanced. The control unit 103 energizes or de-energizes the odd/even line depending upon whether $N$ is odd or even. Assume $N$ is even. When the specific address counter reaches 100, data are read only from the even shift registers. However, the shift registers $N$+1 are selected (but their read/write controls are de-energized) so that they are advanced during the read/write cycle of the shift registers $N$. When the specific address counter reaches 255, the odd/even line is de-energized, thus causing data to be read from or written into the shift registers $N$+1. The shift registers $N$ are not deselected but are restored while data are being read from or written into the shift registers $N$+1.

When the current general address counter reaches 10, the shift registers $N$ have been restored to the proper current address. At this time, the shift register location is incremented one position so that the X and Y decoders 101 and 102 deselect shift registers $N$ and select shift registers $N$+2 in addition to shift registers $N$+1. Now shift registers $N$+2 are advanced during the read/write of shift registers $N$+1. When the current specific address counter reaches 255, the word boundary has been reached and the odd/even line is energized. This causes data to be read from shift registers $N$+2 which are also at the word boundary. Shift registers $N$+1 remain selected until the current general address counter reaches 10 at which time the shift register location is again incremented thus deselecting shift registers $N$+1 and selecting shift registers $N$+3. Reading or writing occurs until the end of the record. At this time, the reading or writing ceases and shift registers $N$+2 and $N$+3 are restored to the current general address 10.

Figure 5A:
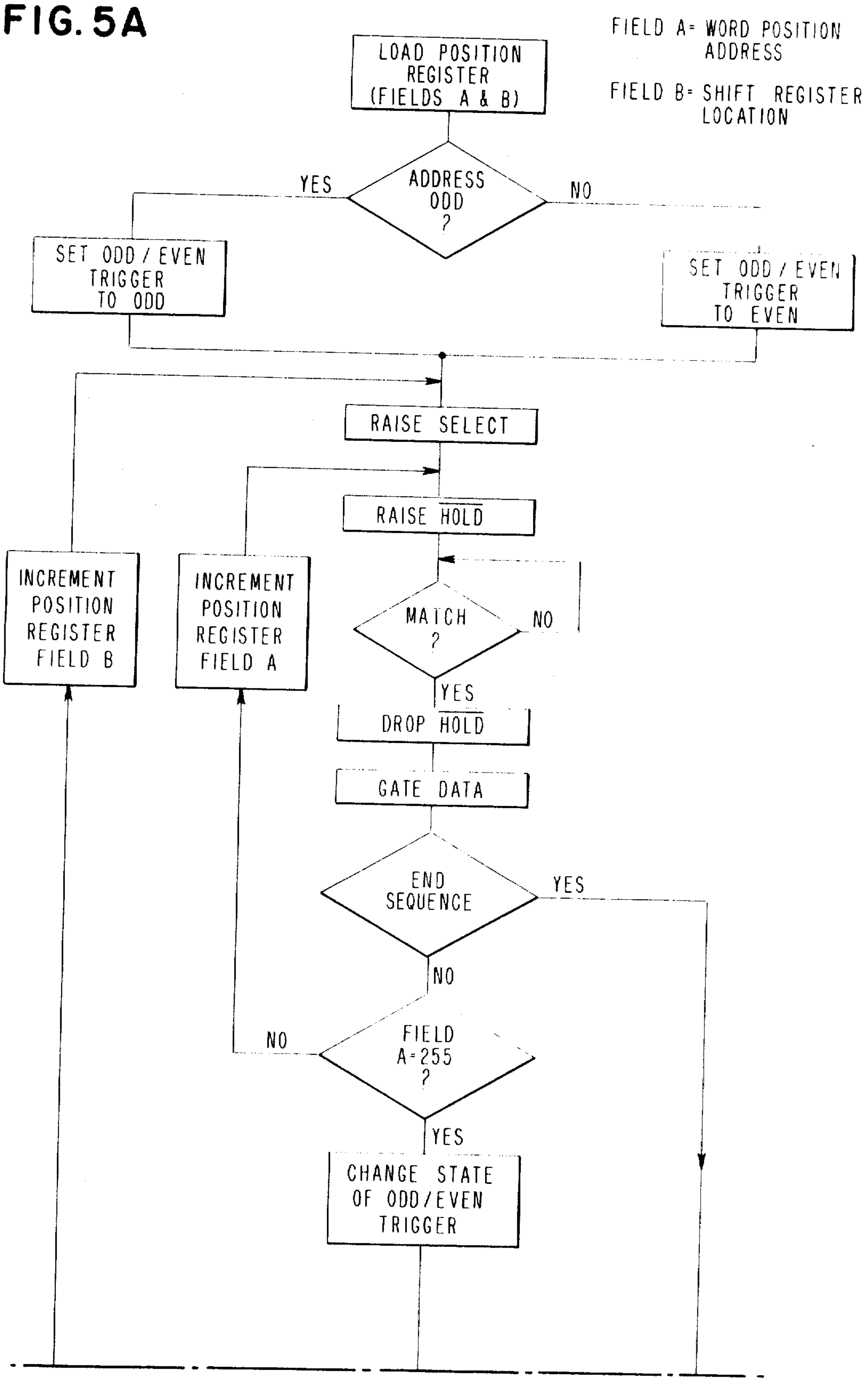
FIGS. 5A and 5B are a flow chart of a typical data transfer operation.
Figure 5B:
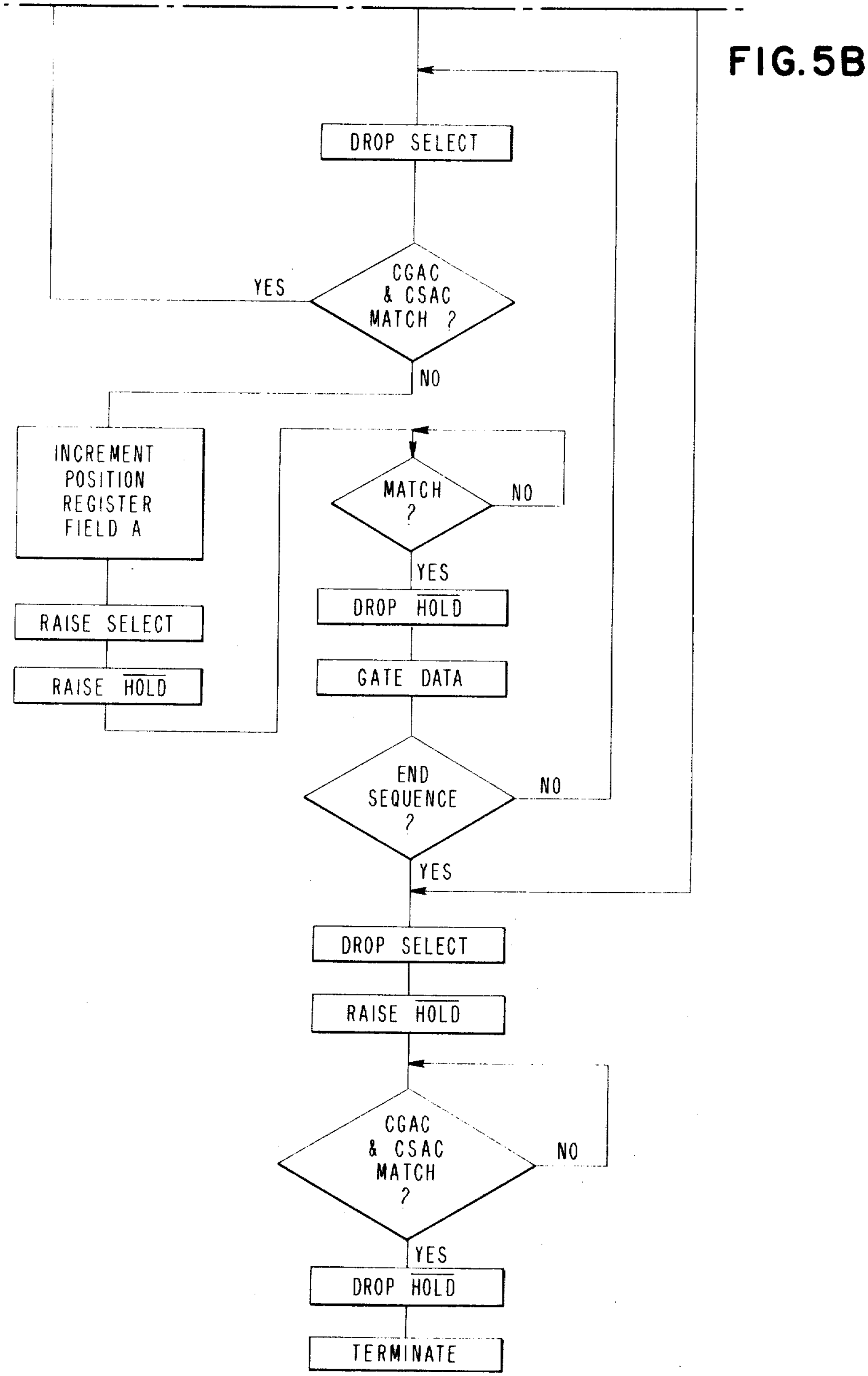

FIGS. 5A and 5B are a flow diagram of the operation of the control unit 103 (FIG. 1) to accomplish the above described continuous data transfer.

The above identified Beausoleil et al. application should be referred to for a more detailed description of the control lines which are described in the flow diagram.

Referring to FIG. 5A, a position address is transferred to the control unit to thus identify the data stored in the storage. Two fields of data are included in the address. Field A is the word position address which identifies one word of the 256 sequential words stored in the shift registers. Field B defines the shift register location, that is, one of the plurality of shift registers (one per plane) which are arranged in columns and rows in the storage. Together these fields fully describe the word locations within the storage.

Field A, the word position address, is placed on the word position address bus 118 (FIG. 1). This bus is compared in the logic 105 with a current specific address counter which indicates the position at any given time of a selected shift register.

The shift register location field B is placed on the shift register location bus. This bus drives the X and Y decoders 101, 102 to thereby select the shift register denoted by field B. The shift register location N (described by field B) and the shift register location $N$+1 are both simultaneously selected by the decoding logic on each card (FIG. 2).

The first step in the flow chart of FIG. 5A loads the position register with both fields A and B. Next, controls in control unit 103 test the address of the shift register location to determine if it is odd or even. If it is odd, an odd/even trigger (not shown) is set to odd thereby energizing the odd/even line from the control unit 103. If even, the odd/even trigger is set to even. The purpose of the odd/even line is to select the appropriate shift registers in the odd or even section of the card (FIG. 2) and to inhibit the shift registers in the other section.

Next, the control unit 103 raises the select line. The select line causes the word position address 118 to be compared with the current specific address counter. Next, the control unit 103 raises the $\overline{\text{hold}}$ line and the shift registers under control of the timing circuits 104 are rotated until a match condition occurs between the specific address counter and the word position address. At this point the control unit drops the $\overline{\text{hold}}$ line and gates the data (to either read or write) at the input/output interface. At this point in the flow logic, the controls test for an end sequence at the interface denoting the end of the data transfer. If no end sequence has been signalled at the input/output interface, the controls 103 test the word position address (field A) to see if a word boundary of the memory has been reached, i.e., word 255. If a word boundary has not been reached, the controls increment the position register field A to thereby present the next word position address to the positioning logic 105 and the above operation is repeated.

Sequential word locations are read until the word position address equals 255 (a word boundary) at which time the control unit 103 changes the state of the odd/even trigger. This causes the odd/even line at the card (FIG. 2) to de-energize the previous selected shift register group and to energize the opposite group.

The flow chart continues on FIG. 5B. After the state of the odd/even trigger has been changed, the controls drop the select line. At this point the first set of shift registers is still selected because their address (field B) is on the shift register location bus. By dropping the select line, the current general address counter is compared with the current specific address counter to see if the selected shift registers have reached the current general address (the address of all other non-selected shift registers).

If the counters match then the control unit increments the position register field B, that is, the shift register location. This causes the first set of shift registers to be deselected which, at this point, have been restored to their current general address.

If the counters do not match, the controls only increment the position register field A, that is, the word position address.

Next, the controls raise the select line, and raise the $\overline{\text{hold}}$ line. This causes the word position address on the word position address bus 118 to be connected to the comparator where it is compared with the current specific address counter. A match indicates that the data has been reached at which point the controls drop the $\overline{\text{hold}}$ line and gate the data to or from the memory. Again an end sequence is tested for. If an end sequence has not occurred, the loop is repeated until the current general address counter and the current specific address counter match. When these two counters do match, the controls increment the position register field B to thereby change the shift register location address. This causes the first selected shift registers to be deselected (they have been restored to the current general address) and to select the next sequential set of shift registers.

The read/write loop is repeated until an end sequence occurs. An end sequence signifies that all of the data has been transferred. In response to an end sequence in any of the loops, the controls drop the select line and raise the $\overline{\text{hold}}$ line. This causes the last selected shift registers to be rotated until the current general address counter and the current specific address counter match, at which point all of the shift registers in the storage have been returned to the current general address. At this point the controls drop $\overline{\text{hold}}$ and terminate the operation.

The above described method of control has been presented for purposes of illustration, it being understood that many other methods of accomplishing the same result can be devised by one having ordinary skill in the art.

While the invention has been particularly shown and described with reference to a preferred embodiment thereof, it will be understood by those skilled in the art that various changes in form and detail may be made therein without departing from the spirit and scope of the invention.

What is claimed is:

1. A memory for storing data at a position address location, said data accessible by presenting a position address to said memory, said address including a shift register location portion and a word position portion;

said memory including a plurality of memory elements in which data bits are electronically rotatable, the improvement comprising:
addressing means for decoding said position address and for selecting and energizing a first group of memory elements at a first location corresponding to said position address and for selecting a second group of memory elements corresponding to a location bearing a predetermined relationship to said first location;
means for electronically rotating data stored in said selected memory elements and for maintaining a specific address indicating the electronic position of said data in said selected elements; and
means for comparing said specific address indicating the electronic position of said data in said selected elements with said word position portion of said position address to thereby indicate that said bits stored in said selected memory elements have been electronically rotated to the word address indicated by said position address.

2. The combination according to claim 1 wherein said memory elements are of the type which require periodic low speed regeneration to maintain the data stored therein;
means for periodically regenerating data stored in said memory elements; and
means responsive to said regeneration means for inhibiting said means for electronically rotating data stored in said selected memory elements for the duration of said regeneration.

3. The combination according to claim 2 wherein said regeneration means includes means for electronically rotating said data stored in said memory elements at least one bit position to thereby regenerate the data stored therein; and
means for maintaining a general address indicating the electronic position of data stored in unselected memory elements, independently of said means for maintaining a specific address indicating the electronic position of said data in said selected memory elements.

4. The method of controlling a bulk memory of the type in which data are stored in memory elements in which data is electronically rotatable comprising the steps of:
rotating data in a set of said elements at low speed to thereby sustain data stored therein;
selecting a first and a second subset of memory elements within said set;
electronically rotating data in said selected first and second subsets of memory elements at a rate which is independent of the rate necessary to sustain data stored in said memory; and
transferring data to or from said first selected subset of memory elements; and
transferring data to or from said second selected subset of memory elements upon the condition that a predetermined amount of data has been transferred to or from the first subset.

5. For use in a bulk memory system, a modular memory plane comprising:
an integrated circuit card having arranged thereon in columns and rows a plurality of modules separated into odd and even groups of modules, each module comprising a plurality of chips, each chip comprising a plurality of memory elements in which data bits are electronically rotatable; and
X-Y coordinate selection means for selecting within said card a module within said odd group and a module within said even group, and within each selected module a chip, and within said chip at least one memory element;
odd data input/output means connected to said memory elements in said odd group to thereby provide common data input/output lines for said odd group;
even data input/output means connected to said memory elements in said even group to thereby provide common input/output lines for said even group; and
means for energizing said odd or said even input/output means;
whereby when said memory elements are selected by said X and Y coordinates, data is transferred to and from either said element in said odd group or said even group by means of one of said common data input/output lines.

6. A memory for storing data at a position address location, said data accessible by presenting a position address to said memory, comprising:
a plurality of memory elements in which data bits are electronically rotatable, said elements arranged in columns and rows;
addressing means for decoding said position address and for energizing at least a first memory element and for energizing a second memory element,
means for electronically rotating data stored in said selected memory elements and for maintaining a specific address indicating the electronic position of bits stored in said elements;
means for comparing said specific address with said position address to thereby indicate that said bits in said selected memory elements have been electronically rotated to the word address indicated by said position address;
means for reading from or writing into said first memory element a predetermined number of words and for indicating said predetermined number; and
means responsive to said indicating means for reading from or writing into said second memory element.

7. The combination according to claim 6 wherein said memory elements are of the type which require periodic low speed regeneration to maintain the data stored therein;
means for periodically regenerating data stored in said memory elements; and
means responsive to said regeneration means for inhibiting said means for electronically rotating data stored in said selected memory elements for the duration of said regeneration.

8. The combination according to claim 7 wherein said regeneration means includes means for electronically rotating data bits in said memory elements at least one bit position to thereby regenerate the data stored therein;
means for maintaining a general address indicating the electronic position of data stored in unselected memory elements, independently of said means for maintaining a specific address indicating the electronic position of said data in said selected memory elements; and
means for selecting a third memory element upon the condition that said predetermined number of words has been read from or written into said first element and data in said selected element has been rotated to the position of data in said unselected elements.

9. A bulk memory system comprising:
a plurality of integrated circuit cards having arranged thereon in columns and rows a plurality of modules in odd groups and even groups, each module comprising a plurality of chips, each chip comprising a plurality of memory elements in which data bits are electronically rotatable, said cards arranged in a three dimensional memory such that each card represents a bit position of a parallel word;
X–Y coordinate selection means for selecting within each card a module in said odd group and a module in said even group, and within each module a chip, and within each chip at least one memory element, the X–Y coordinates of each card connected in parallel to the corresponding X and Y coordinates of each other card in said memory.

10. The combination according to claim 9 further including odd data input/output means connected to said memory elements in said odd group and even data input/output means connected to said memory elements in said even group to thereby provide data inputs/outputs for each bit position;
whereby when said memory is selected by said X and Y coordinates, data is transferred to and from each memory element in said odd or said even group by means of said data input/output lines.

11. The method of controlling a memory of the type which comprises a plurality of multibit memory elements in which bits are electronically rotatable and in which data are stored sequentially up to a word boundary, said elements arranged in columns and rows of odd numbered groups and even numbered groups in memory planes, one plane for each bit position of a word, including address decoding means for selecting a column and a row in each group to thereby select an odd memory element location and an even memory element location on each plane, with further means for electronically rotating data bits in the selected memory elements in unison to thereby read or write words in parallel, each bit 'f a word being read from or written into a corresponding memory plane, comprising the steps of:

maintaining a specific address count of the contents of the memory elements as the data therein are rotated;

locating a particular word by comparing the address of the particular word with said specific address count whereby when the two compare, the word corresponding to the word address appears at the output of the odd or even selected memory elements;

reading data from or writing data into one of said groups of elements; and reading data from or writing data into the opposite group of elements upon the condition that a word boundary has been reached at said one of said groups.

12. The method of claim 11 further comprising the steps of:

comparing the word position address of the first word of a block of words with said specific address count;

electronically rotating the bits in said selected memory elements at high speed until the specific address count matches the word position address; and accessing successive words by incrementing the word position address and electronically rotating the bits in said selected memory elements one word position at a time.

13. A memory comprising:

a plurality of multibit memory elements arranged in columns and rows in memory planes, one plane for each bit position of a word;

address decoding means for selecting a column and a row to thereby select a first memory element location on each plane, and to automatically select a next sequential memory element location;

means for electronically rotating the bits in said selected memory elements in unison;

means for reading out words in parallel, or writing words in parallel from the first selected group of memory elements; and means operative when a word boundary for the first selected elements is reached for halting the reading or writing for the second selected elements whereby no delay is imposed for deselection and reselection of memory elements.

* * * * *